Figure 1:
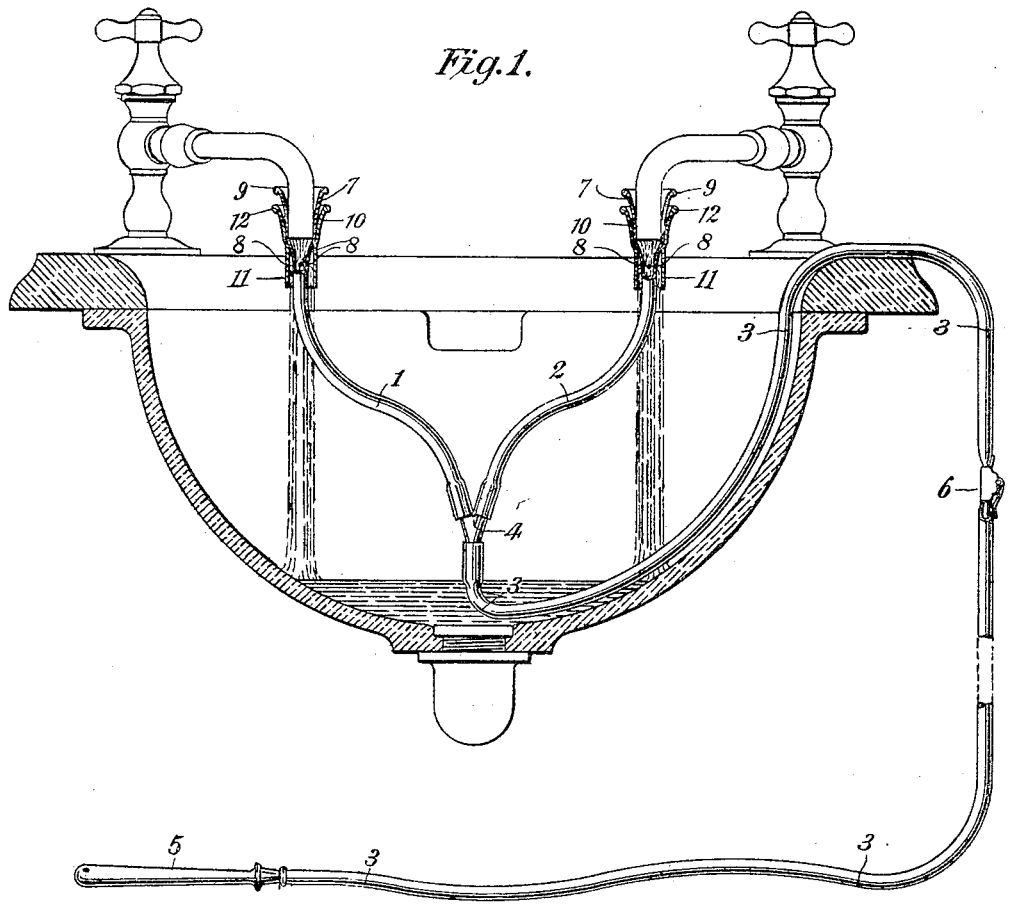

No. 801,019. PATENTED OCT. 3, 1905.
C. J. KINTNER.
FOUNTAIN SYRINGE.
APPLICATION FILED SEPT. 16, 1904.

2 SHEETS—SHEET 1.

WITNESSES:
C. E. Ashley
M. F. Keating

INVENTOR
Charles J. Kintner

No. 801,019. PATENTED OCT. 3, 1905.
C. J. KINTNER.
FOUNTAIN SYRINGE.
APPLICATION FILED SEPT. 16, 1904.
2 SHEETS—SHEET 2.
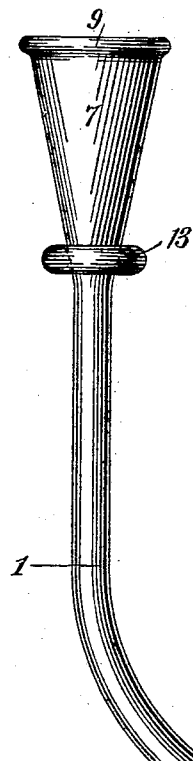
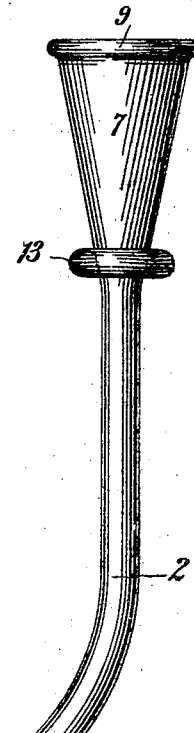
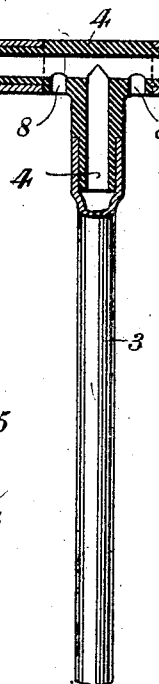
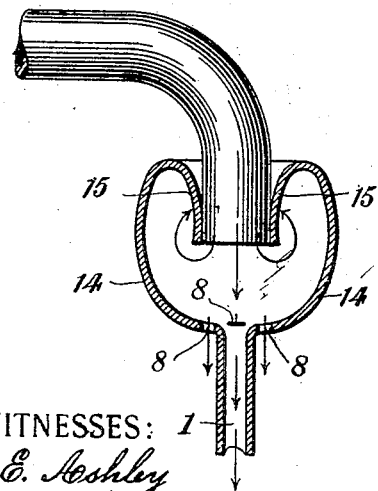
Fig. 6.
Fig. 5.
Fig. 7.
WITNESSES:
C. E. Ashley
M. F. Keating
INVENTOR
Charles J. Kintner

UNITED STATES PATENT OFFICE.

CHARLES J. KINTNER, OF NEW YORK, N. Y.

FOUNTAIN-SYRINGE.

No. 801,019.    Specification of Letters Patent.    Patented Oct. 3, 1905.

Application filed September 16, 1904. Serial No. 224,679.

*To all whom it may concern:*

Be it known that I, CHARLES J. KINTNER, a citizen of the United States, residing at New York, borough of Manhattan, county and State of New York, have made a new and useful Invention in Fountain-Syringes, of which the following is a specification.

My invention has for its objects, first, to provide means whereby water at relatively high heads or pressures may be practically utilized with syringe-nozzles, so as to act on the principle of a fountain-syringe; second, to provide means whereby hot and cold water may be simultaneously utilized in connection with the faucets of stationary washbasins, bath-tubs, and the like for syringing purposes and in such manner that the temperature thereof or the pressure, or both, may be varied by the user at will; third, to provide means for preventing the compressed air which frequently accumulates in the pipes of water systems from reaching the nozzle of a syringe-tube when connected to such pipes through the agency of connectors attached or secured directly to a faucet or faucets of a washbasin, bath-tub, &c.

Prior to my invention attempts had been made to utilize water at relatively high pressure—such, for instance, as is found in connection with stationary washbasins or bath-tubs—supplied from water mains or pipes by connecting syringe-nozzles with the supply-faucets, either one or both, through the agency of detachable connectors and rubber or like flexible tubes; but all such applications, in so far as I am aware, have not met with success, for the reason that ordinarily running water utilized in connection with stationary basins or bath-tubs is supplied at such head or pressure as to make the application thereof for this purpose wholly impractical unless means be provided for relieving the pressure at the syringe-nozzle when the cut-off is closed, such means, however, not having been heretofore devised. I have also ascertained that with existing appliances for utilizing water at relatively high pressures from and through the nozzles of the faucets of washbasins, bath-tubs, &c., it frequently happens that air under pressure passes out with the water, thereby producing an effect which renders the use of such types of appliances for syringe purposes impractical, there being no means provided in connection with such appliances for overcoming this very objectionable feature.

My invention contemplates the use of one or more flexible tubes and a syringe-nozzle with the faucet or faucets of stationary washbasins or bath-tubs and the provision of means whereby the pressure of the water may be relieved at the syringe-nozzle, as desired by the user, when the cut-off is closed, the arrangement being such that the temperature of the water used may be regulated as desired.

For a full and clear understanding of the invention, such as will enable others skilled in the art to construct and use the same, reference is had to the accompanying drawings, in which—

Figure 3:
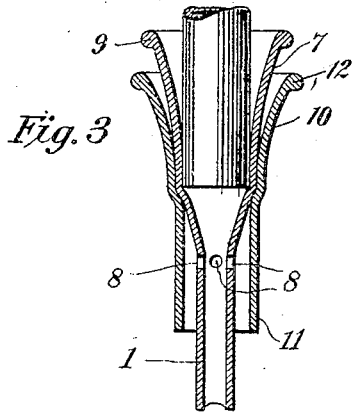
Figure 2:
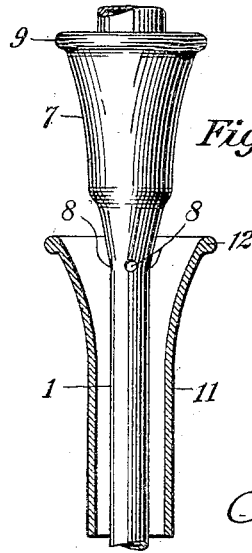
Figure 4:
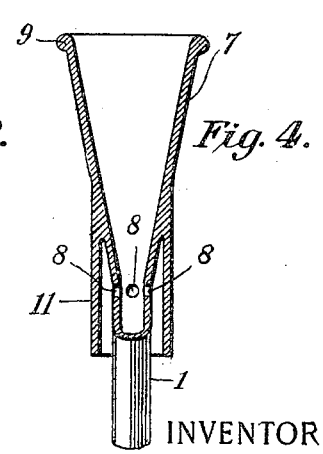

Figure 1 illustrates the preferred form of my invention as applied to the hot and cold water faucets of a stationary washbasin, the latter being shown in sectional view, the complete syringe and the faucets being shown in elevational view, while the means for attaching the syringe and relieving the pressure when the cut-off is closed are shown also in sectional view. Fig. 2 is an enlarged detail view illustrating the means shown in Fig. 1 for effecting the result sought, the yielding surrounding sleeve, however, in this view being shown in its lower or detached position. Fig. 3 is an enlarged sectional view showing all of the parts in position on the faucet and ready for use. Fig. 4 is a sectional view of a modified form of the invention in which the cylindrical surrounding sleeve is integral with the bell-mouthed part by which the syringe is attached to a water-faucet. Fig. 5 is a sectional view of a modified form of the invention, showing the same attached to a water-faucet. Fig. 6 is an elevational view of a further modified form of the invention, the means for relieving the pressure when the cut-off is closed, however, being shown in sectional view and in the three-way connector. Fig. 7 is a sectional view of still another modified form of the invention, illustrating it in position within the interior of a water-faucet, which faucet in this instance is shown partly in sectional view.

Referring now to the drawings in detail, in which like numerals represent like or equivalent parts wherever used, and first to Figs. 1 to 3, inclusive, 1 2 represent two flexible tubes, preferably of soft rubber, having their upper ends provided with integral cone-shaped or bell-mouthed parts 7 and integral rings 9, said parts being adapted, by reason of their elasticity or yielding nature, to be drawn over the end of the faucet of either a stationary washbasin or a bath-tub, which faucets usually vary materially in their external diameters. At the lower ends of these bell-mouthed parts there is or are provided in each instance one or more vent openings or holes 8 8, having, preferably, sufficient water-carrying capacity to equal that of the tube itself. 3 is the syringe-tube proper, being also preferably of soft rubber and of sufficient length to suit the convenience of the user, preferably about six feet. The tubes 1, 2, and 3 are connected together by a hard-rubber or equivalent three-way connector 4. 5 is the syringe-nozzle, and 6 is a well-known form of spring or snap-acting cut-off for checking the flow of the water to the nozzle 5 when desired. 10 10 are bell-mouthed or cone-shaped sleeves, also of good soft rubber or other flexible material and provided with integral elastic rings 12 at their upper ends, the interior diameter of the sleeve 10 at its lower end being preferably the same as the interior diameter of a downwardly-extending cylindrical sleeve 11, adapted to wholly surround the vent openings or holes 8 8, when the parts are in the position shown in Figs. 1 and 3, and in such manner as to throw the vented water always downward toward the bottom of the basin or bath-tub. The operation of this preferred form of the invention is as follows: The user first draws the flexible bell-mouthed parts 7 securely over the ends of the hot and cold water faucets in the manner shown in Fig. 2 and afterward forces the bell-mouthed or cone-shaped sleeves 10 10 around the parts 7 in such manner as to firmly secure the same to the mouths of the faucets with the cylindrical portions of the sleeves 11 surrounding the vent openings or holes 8 8 8 8. The cut-off 6 being open, the water is turned on by the user in both of the faucets until the desired temperature and pressure are attained at the openings in the nozzle 5, after which the cut-off is closed in the manner shown. During the time that this regulation is being effected a portion of the water flows from each faucet into the basin through the vent-openings 8 8, being directed downward by the sleeves 11 11 in the manner shown, and when the cut-off 6 is closed all of the water flows therethrough in the manner shown in Fig. 1, these vent-openings offering a sufficient exit for the water to prevent the accidental detachment of the parts from the faucets when the cut-off is closed. The person when using the syringe inserts the nozzle and then opens the cut-off 6, and the pressure and the temperature are found to be the same as they were when the prior test was made. The temperature and the pressure may then be further varied in accordance with the wishes of the user by varying relatively the movement of the cocks of both faucets. I have ascertained that with such an arrangement it is possible to vary the pressure at the nozzle 5 from practically nothing to that of the full head at the faucets, the elastic or gripping nature of the bell-mouthed parts 7 and the surrounding cone-shaped sleeves being such as to secure the syringe at all times, whether the cut-off be closed or not, and this especially by reason of the venting action of the vent-openings or holes 8 8, as shown in Fig. 1. It will also be appreciated that the temperature may be varied by turning the cocks relatively. I have also ascertained that with the use of such vents or openings in connection with appliances of the nature hereinbefore described I am enabled to totally relieve any evil or unpleasant effects due to the escape of air under pressure through the syringe-nozzles by reason of the fact that the air is always vented at the vent-openings 8, and this feature constitutes one of the essential points of utility of my invention.

In Fig. 4 of the drawings I have illustrated a modified form of the invention in which the bell-mouthed sleeve 10 is done away with and the cylindrical sleeve 11 is integral with the bell-mouthed part 7, the relation of said cylindrical sleeve to the vent openings or holes being always constant and its function as before to direct the water downward into the basin.

In Fig. 5 of the drawings I have shown a still further modified form of the invention in which I have utilized a well-known form of flexible connector 14, made, preferably, of soft rubber and integral with the syringe-tube 1, said connector having an inwardly-extending neck 15 and held in position upon the faucet by reason of the pressure of the water against the inner surface thereof, as is well understood by those skilled in the art and as indicated by the curved arrows. In this form of the invention the vent-openings or holes 8 surround the mouth or inlet of the tube 1 and the water is vented therethrough, as indicated by the arrows, when the cut-off is closed, or a portion thereof is vented therethrough when said cut-off is open in the same manner as is disclosed in Fig. 1.

In Fig. 6 of the drawings I have illustrated a still further modified form of the invention in which the bell-mouthed parts 7 7 are, as before, integral with the tubes 1 2, but are not provided with vent-openings, the vent-openings 8 8 being in this instance in the three-way connector 4, as shown, 13 13 being flexible rubber rings or spiral steel-wire rings, if preferred, for aiding in securing the bell-mouthed parts 7 7 directly to the faucets as before.

In Fig. 7 I have illustrated a still further modified form of the invention, but one which is not deemed by me to be quite as practical as those before disclosed. In this form of the invention the neck 15, corresponding to the same part in Fig. 5, is inserted inside of the mouth of a faucet and is in the nature of a rubber stopper or cork having a series of vent-openings 8 8 corresponding to the before-described vent-openings and surrounding a tubular hard-rubber connector to which the syringe-tube 1 is directly connected. In this form of the invention the waste water is vented into the basin or bath-tub through the vent openings or holes 8 as before, and the operation will be obvious in view of what has heretofore been said.

In all of the modified forms the vent-openings may be of any preferred number and size and arranged in any way desired, so long as they relieve the pressure put upon the parts and regulate the same for use in the manner described.

I do not limit my invention to the especial details of construction illustrated in the several modified forms disclosed in the accompanying drawings, as many of the features thereof may be departed from and still come within the scope of my claims hereinafter made. I believe it is broadly new with me to provide means for relieving the pressure due to relatively high heads of water, such as are found in connection with stationary washbasins or bath-tubs and analogous uses, in such manner as to adapt the same for use in connection with syringe-nozzles connected to flexible tubes provided with cut-offs and that it is also new with me to vary both the pressure and the temperature of such water in accordance with the wishes of the user, and my claims are generic as to these features; nor do I limit the location of the vent openings or holes 8 8, as obviously the same may be variously disposed, the essence of the invention consisting in relieving the pressure of the water in the syringe when the cut-off is closed by venting it into the basin, bath-tub, or similar vessel, the preferred arrangement being such, however, that the water when vented shall always be thrown downward toward the bottom of the basin or vessel, thus avoiding any possibility of wetting the user or anything in the immediate vicinity.

Having thus described my invention, what I claim, and desire to secure by Letters Patent of the United States, is—

1. Means for utilizing water from a stationary faucet at relatively high pressures, consisting of a tube having a flexible or yielding connector for frictionally attaching the same to the faucet; together with venting means having a venting or carrying capacity approximating that of the tube, substantially as described.

2. A flexible syringe-tube and a nozzle connected thereto, said tube being provided with a cut-off and means for connecting it to the faucet of a stationary washbasin; in combination with additional means for relieving the pressure of the water in the tube when the cut-off is closed, substantially as described.

3. A syringe embracing a three-way tube, a nozzle and a cut-off for one of said tubes, the other tubes being provided with means for connecting them respectively to the hot and cold water faucets of a stationary washbasin and additional means for relieving the pressure of the water delivered to the tube when the cut-off is closed, substantially as described.

4. A syringe embracing a three-way tube, one of said tubes being provided with a nozzle and a cut-off, the other tubes being provided with means for connecting them respectively to the hot and cold water faucets of a stationary washbasin; together with one or more vents for relieving the pressure of the water delivered to the tubes when the cut-off is closed, substantially as described.

5. A syringe embracing a three-way tube, one of said tubes being provided with a cut-off and a nozzle, and the others with means for connecting them respectively to the hot and cold water faucets of a stationary washbasin; together with vent openings or holes so constructed and arranged as to direct the vented water therefrom into the basin, substantially as described.

6. A flexible syringe-tube provided with a cut-off and means for connecting it to the faucet of a stationary washbasin, said tube having one or more vent-openings for relieving the pressure of the water delivered to it when the cut-off is closed, substantially as described.

7. A flexible syringe-tube provided with a yielding connector for connecting it to the faucet of a stationary washbasin; a cut-off and a vent for relieving the pressure of the water delivered to the tube when the cut-off is closed, substantially as described.

In testimony whereof I have signed my name to this specification in the presence of two subscribing witnesses.

CHARLES J. KINTNER.

Witnesses:
M. TURNER,
M. F. KEATING.